United States Patent
Choi et al.

(10) Patent No.: US 11,717,895 B2
(45) Date of Patent: Aug. 8, 2023

(54) CUTTING INSERT AND CUTTING TOOL ASSEMBLY INCLUDING SAME

(71) Applicant: TAEGUTEC LTD., Daegu (KR)

(72) Inventors: Chang Hee Choi, Daegu (KR); Chang Won Jeong, Daegu (KR)

(73) Assignee: TaeguTec Ltd., Daegu (KR)

( * ) Notice: Subject to any disclaimer, the term of this patent is extended or adjusted under 35 U.S.C. 154(b) by 266 days.

(21) Appl. No.: 17/327,149

(22) Filed: May 21, 2021

(65) Prior Publication Data
US 2022/0371101 A1   Nov. 24, 2022

(51) Int. Cl.
*B23B 27/16* (2006.01)

(52) U.S. Cl.
CPC ...... *B23B 27/1622* (2013.01); *B23B 2200/16* (2013.01); *B23B 2200/165* (2013.01); *B23B 2205/12* (2013.01); *B23B 2205/16* (2013.01)

(58) Field of Classification Search
CPC ............ B23B 2200/16; B23B 2205/12; B23B 2200/0477; B23B 2200/0471; B23B 2200/049; B23B 2200/121; B23B 2200/165; B23B 2200/0495; B23B 27/1614; B23B 27/1622; B23B 2205/16; B23B 2200/205
See application file for complete search history.

(56) References Cited

U.S. PATENT DOCUMENTS

| | | | |
|---|---|---|---|
| 3,629,919 A * | 12/1971 | Trevarrow, Jr. ......... | B23B 27/06 407/103 |
| 4,209,047 A * | 6/1980 | Weill .................... | B23B 27/164 407/103 |
| 5,682,803 A | 11/1997 | Boianjiu | |
| 5,738,468 A | 4/1998 | Boianjiu | |
| 5,810,518 A * | 9/1998 | Wiman ............... | B23B 27/1614 407/102 |
| 6,146,061 A * | 11/2000 | Larsson ................ | B23B 27/145 407/120 |

(Continued)

FOREIGN PATENT DOCUMENTS

WO   WO-8911367 A  *  11/1989   ......... B23B 27/1611

OTHER PUBLICATIONS

International Search Report dated Aug. 23, 2022 in counterpart application PCT/KR2022/007169.

*Primary Examiner* — Sara Addisu
(74) *Attorney, Agent, or Firm* — Womble Bond Dickinson (US) LLP

(57) ABSTRACT

Embodiments of a cutting insert are provided. The cutting insert includes an upper surface, a lower surface, a plurality of side surfaces extending between the upper surface and the lower surface, an insert hole extending through the upper surface and the lower surface, and a corner portion provided with a cutting edge. At least one of the upper surface and the lower surface has a plurality of recesses extending between the insert hole and the corner portion. The plurality of recesses includes a first recess into which one portion of the mounting portion is inserted when the cutting insert is supported by the mounting portion, and a second recess into which another portion of the mounting portion is inserted when the cutting insert is supported by the mounting portion. The second recess has a side wall spaced apart from another portion of the mounting portion.

17 Claims, 25 Drawing Sheets

(56) References Cited

U.S. PATENT DOCUMENTS

| | | | |
|---|---|---|---|
| 6,343,898 B1* | 2/2002 | Sjoo | B23B 27/1614 407/107 |
| 7,201,545 B2 | 4/2007 | Ejderklint | |
| 7,325,471 B2* | 2/2008 | Massa | B23B 31/003 407/103 |
| 7,510,354 B2* | 3/2009 | Andersson | B23C 5/2213 407/66 |
| 7,537,419 B2* | 5/2009 | Sjoberg | B23B 27/1611 407/103 |
| 7,632,046 B2 | 12/2009 | Andersson et al. | |
| 7,645,100 B2* | 1/2010 | Andersson | B23B 27/065 407/66 |
| 7,670,088 B2* | 3/2010 | Andersson | B23C 5/2208 407/66 |
| 7,819,610 B2* | 10/2010 | Wallstrom | B23C 5/2213 407/113 |
| 8,313,270 B2* | 11/2012 | Hecht | B23C 5/2213 407/66 |
| 8,573,903 B2* | 11/2013 | Morrison | B23C 5/2213 407/115 |
| 8,657,539 B2* | 2/2014 | Morrison | B23C 5/2213 407/62 |
| 8,858,130 B2* | 10/2014 | Morrison | B23C 5/06 407/62 |
| 9,481,039 B2 | 11/2016 | Park | |
| 10,357,833 B2* | 7/2019 | Oh | B23C 5/22 |
| 2005/0152754 A1* | 7/2005 | Wiman | B23B 27/1611 407/103 |
| 2006/0216121 A1* | 9/2006 | Edler | B23B 27/1611 407/104 |
| 2007/0160431 A1 | 7/2007 | Pantzar | |
| 2008/0056831 A1 | 3/2008 | Wiman et al. | |
| 2013/0236255 A1* | 9/2013 | Hecht | B23B 27/1622 407/103 |
| 2014/0227051 A1* | 8/2014 | Hecht | B23B 29/06 407/103 |
| 2014/0294525 A1* | 10/2014 | Hecht | B23B 27/1651 407/103 |
| 2016/0107248 A1* | 4/2016 | Smycek | B23C 5/202 407/115 |
| 2016/0368062 A1 | 12/2016 | Hen | |
| 2019/0047061 A1 | 2/2019 | Ida et al. | |
| 2020/0238392 A1* | 7/2020 | Chang | B23B 27/1614 |
| 2020/0361001 A1* | 11/2020 | Hecht | B23B 27/04 |
| 2021/0213540 A1* | 7/2021 | Ida | B23B 27/1611 |

* cited by examiner

CUTTING INSERT AND CUTTING TOOL ASSEMBLY INCLUDING SAME

FIELD OF THE INVENTION

The present disclosure relates to a cutting insert and a cutting tool assembly including the same.

BACKGROUND OF THE INVENTION

When cutting a workpiece using a cutting tool, in order to improve the roughness and quality of a finished surface, it is important to allow chips to be smoothly generated in a rounded shape and to secure a space through which the generated chips can be discharged smoothly. In particular, in the case of a turning insert, the entering angle (i.e., the angle between the cutting edge of the insert and the workpiece surface) during back-turning is smaller than the entering angle during front-turning. As such, it is more important to secure a space through which the chips can be smoothly discharged by effectively arranging the cutting edge and the chip former with respect to the workpiece.

In a conventional turning insert, in the case of a positive single-sided insert having a triangular shape and a holder to which such a positive single-sided insert is mounted, both sides of the insert are supported by the insert support portion of the holder positioned in the back-turning direction. Due to this support structure, it is difficult to secure a chip discharge space and there is a problem in that the depth of cut for back-turning is limited.

Furthermore, in the conventional turning insert, in the case of a negative double-sided insert having a triangular shape and a holder to which such a negative double-sided insert is mounted, in addition to the problem caused by the structure of the insert support portion of the aforementioned holder, the insert is mounted on the holder so that the upper surface of the insert is inclined at a negative angle with respect to the centerline of the workpiece. Accordingly, it is inevitable to secure a relatively narrower chip discharge space than that available in the case of using the positive single-sided triangular insert in which the arrangement of the cutting edge and the upper surface of the chip former has an angle almost coinciding with the centerline of the workpiece. For that reason, the state of the generated chips is poor and the flow of the discharged chips may not be smooth.

SUMMARY OF THE INVENTION

Various embodiments of the present disclosure provide a cutting insert capable of smoothly generating chips and satisfactorily discharging the chips during a turning operation, as well as a cutting tool assembly including the same.

Furthermore, various embodiments of the present disclosure provide a cutting insert having a rigid support structure without an insert support portion of a holder, as well as a cutting tool assembly including the same.

According to one embodiment of the present disclosure, there is provided a cutting insert supported by a mounting portion when mounted on a cutting tool, including: an upper surface; a lower surface; a plurality of side surfaces extending between the upper surface and the lower surface; an insert hole extending through the upper surface and the lower surface; and a corner portion provided with a cutting edge, wherein at least one of the upper surface and the lower surface has a plurality of recesses extending between the insert hole and the corner portion, the plurality of recesses including a first recess into which one portion of the mounting portion is inserted when the cutting insert is supported by the mounting portion, and wherein a second recess into which another portion of the mounting portion is inserted when the cutting insert is supported by the mounting portion, the second recess having a side wall spaced apart from another portion of the mounting portion.

In one embodiment, the first recess may make contact with the mounting portion at two points, and the second recess may have a bottom surface making contact with the mounting portion.

In one embodiment, the first recess and the mounting portion may make contact with each other at a pair of first contact points, the bottom surface of the second recess and the mounting portion may make contact with each other at a second contact point, and a line connecting one of the first contact points and the second contact point may form an inclination angle with respect to a reference plane perpendicular to an extension direction of the insert hole.

In one embodiment, each of the upper surface and the lower surface may include a rake face inclined with respect to the reference plane perpendicular to the extension direction of the insert hole, the upper surface and the lower surface may be symmetrical to each other, and each of the upper surface and the lower surface may include three corner portions.

In one embodiment, the inclination angle may be more than 0° and 9° or less, preferably 4° to 6°.

In one embodiment, two corner portions may be provided on the upper surface, and the two corner portions may be rotationally symmetrical by 180° with respect to a center axis of the insert hole.

In one embodiment, the inclination angle may be more than 0° and 9° or less, preferably 1° to 2°.

According to another embodiment, there is provided a cutting tool assembly, including: a holder configured so that a cutting insert is supported by a mounting portion, wherein the mounting portion includes a first protrusion and a second protrusion formed on a surface supporting the cutting insert, the holder being configured to make contact with a side surface of the cutting insert to support the cutting insert and fix the cutting insert to the mounting portion through a fixing means, the cutting insert includes an upper surface, a lower surface, a plurality of side surfaces extending between the upper surface and the lower surface, an insert hole extending through the upper surface and the lower surface, and a corner portion provided with a cutting edge, at least one of the upper surface and the lower surface having a plurality of recesses extending between the insert hole and the corner portion, the plurality of recesses including a first recess into which a first protrusion of the mounting portion is inserted when the cutting insert is supported by the mounting portion and a second recess into which a second protrusion of the mounting portion is inserted when the cutting insert is supported by the mounting portion, and the second recess has a side wall spaced apart from the second protrusion of the mounting portion.

In another embodiment, the first recess may make contact with a first protrusion of the shim at two points, and the second recess may have a bottom surface making contact with a second protrusion of the mounting portion.

In another embodiment, the first recess and the first protrusion of the mounting portion may make contact with each other at a pair of first contact points, the bottom surface of the second recess and the second protrusion of the mounting portion may make contact with each other at a second contact point, and a line connecting one of the first contact points and the second contact point may form an inclination angle with respect to a reference plane perpendicular to an extension direction of the insert hole.

In another embodiment, each of the upper surface and the lower surface of the cutting insert may include a rake face inclined with respect to the reference plane perpendicular to the extension direction of the insert hole, the upper surface and the lower surface may be symmetrical to each other, and each of the upper surface and the lower surface may include three corner portions.

In another embodiment, the inclination angle may be more than 0° and 9° or less, preferably 4° to 6°.

In another embodiment, when the cutting insert is mounted on the holder, the upper surface of the cutting insert may form an angle of −5° to +5° with respect to a centerline of a workpiece to be cut by the cutting insert.

In another embodiment, two corner portions may be provided on the upper surface, and the two corner portions may be rotationally symmetrical by 180° with respect to a center axis of the insert hole.

In another embodiment, the inclination angle may be more than 0° and 9° or less, preferably 1° to 2°.

In another embodiment, when the cutting insert is mounted on the holder, only a side surface of the cutting insert located on the opposite side of the first recess may make contact with the holder.

In another embodiment, a cutting edge located on one side of the first recess of the cutting insert may form an angle of less than 90° with respect to a rotation center axis of the workpiece, and a cutting edge located on the other side of the first recess of the cutting insert may form an angle of greater than 90° with respect to the rotation center axis of the workpiece.

BRIEF DESCRIPTION OF DRAWINGS

The accompanying drawings, which are incorporated in and constitute a part of the specification, illustrate embodiments of the present disclosure.

DETAILED DESCRIPTION OF THE INVENTION

Figure 1:
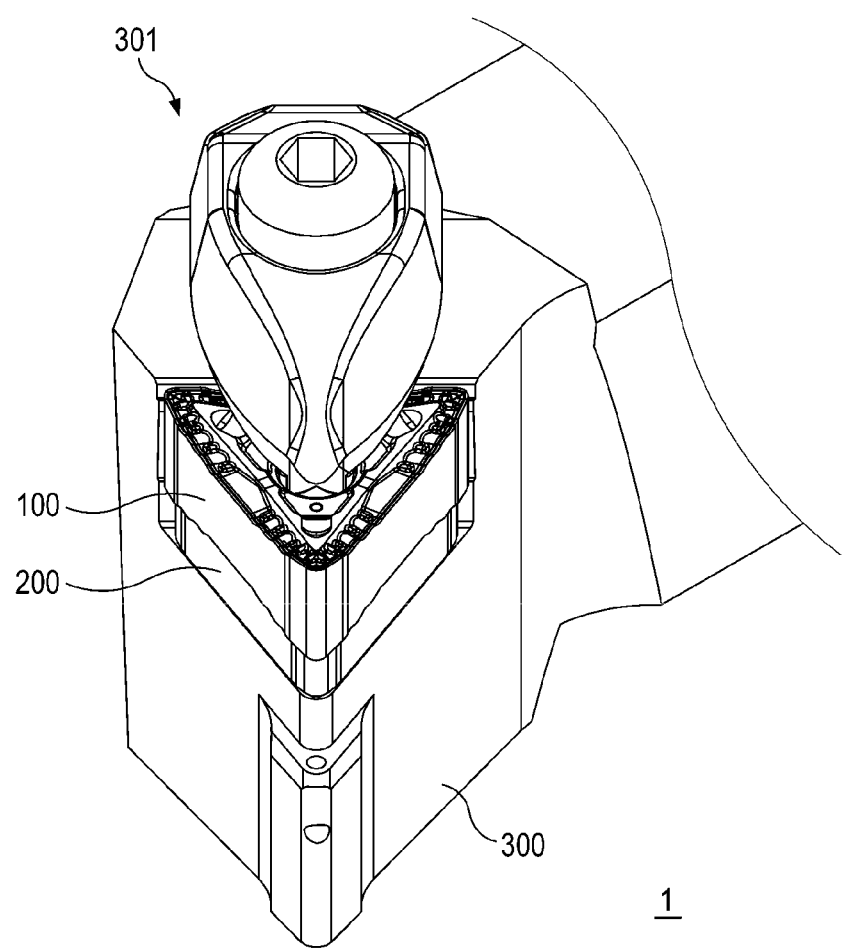
FIG. 1 is a perspective view showing a cutting tool assembly according to one embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions such as "first," "second," etc., which are shown in various embodiments of the present disclosure, are used to separate a plurality of elements from each other, and are not intended to limit an order or importance of the corresponding elements.

The directional term "upward," "upper," etc., used herein is based on a direction in which an upper face is positioned with respect to a lower face in the accompanying drawings. The directional term "downward," "lower," etc., means a direction opposite to the upward or upper direction. A cutting insert shown in the accompanying drawings may be otherwise oriented and the above-described directional terms may be interpreted accordingly.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Hereinafter, embodiments of a cutting insert and a cutting tool assembly including same will be described with reference to the accompanying drawings.

Figure 2:
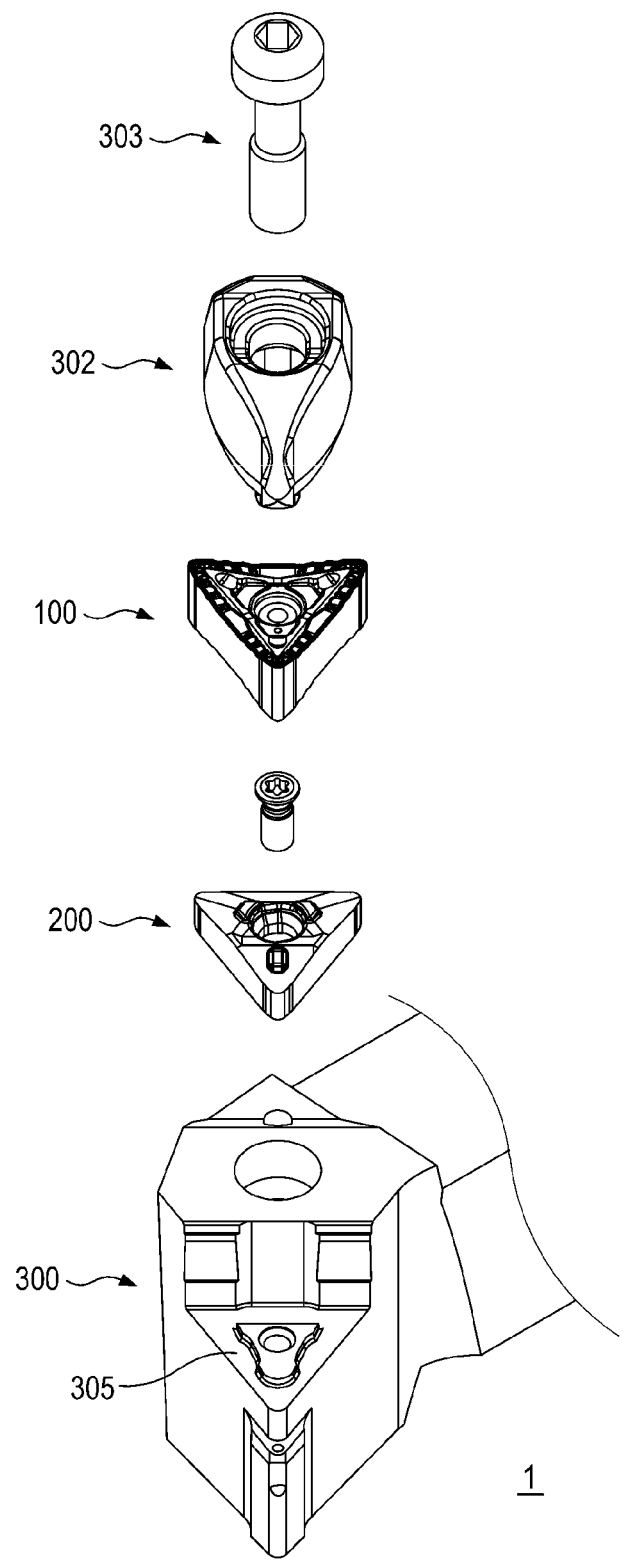
FIG. 2 is an exploded perspective view of the cutting tool assembly shown in FIG. 1.

FIG. 1 is a perspective view showing a cutting tool assembly 1 according to one embodiment of the present disclosure. FIG. 2 is an exploded perspective view of the cutting tool assembly 1 shown in FIG. 1.

Referring to FIGS. 1 and 2, the cutting tool assembly 1 may be used for a turning operation. The cutting tool assembly 1 may be installed on a lathe and configured to cut a rotating workpiece W. The cutting tool assembly 1 may include a cutting insert 100, a mounting portion 200 or 305 and a holder 300. The mounting portion 200 or 305 may be a shim 200 or may be a bottom surface 305 of a holder pocket portion if there is no shim. Hereinafter, a case where the mounting portion 200 or 305 is a shim 200 will be described.

The holder 300 is used to fix the cutting insert 100 and the shim 200. A protrusion corresponding to a groove formed on the lower surface 220 of the shim 200 when mounting the shim 200 on the holder 300 may be formed on the bottom surface 305 of the pocket portion of the holder 300. The groove of the shim 200 and the protrusion of the holder 300 may be in contact with each other. When the shim 200 is viewed from below, for example, a groove having a triangular shape or other shapes is formed on the lower surface 220 of the shim 200. The protrusion is formed to have a cross-section corresponding to the groove formed on the lower surface 220 of the shim 200 in, for example, a triangular shape or other shapes. The protrusion has a recessed edge.

When mounting the cutting insert 100 on the holder 300, the shim 200 may be mounted on the holder 300, and the cutting insert 100 may be mounted on the upper surface 210 of the shim 200. The side surface of the pocket portion of the holder 300 may make contact with the side surface 130 of the cutting insert 100 to support the same, and may fix the cutting insert 100 and the shim 200 through a fixing means 301. Specifically, the shim 200 may be fixed to the holder 300 by a fixing means such as a screw or the like. The cutting insert 100 mounted on the upper surface 210 of the shim 200 may be fixed by a clamp 302, or a fixing means 301 such as a screw or the like. The clamp 302 may be fixed to the holder 300 by a clamp screw 303.

In the cutting tool assembly 1 according to one embodiment, the groove formed on the lower surface 220 of the shim 200 is coupled to the protrusion formed on the holder 300, and the shim 200 is fixed to the holder 300 by a fixing means such as a screw or the like. The cutting insert 100 is located on the upper surface 210 of the shim 200. The clamp 302 makes contact with an insert hole 140 of the cutting insert 100. The clamp 302 is fixed to the holder 300 by the clamp screw 303. The clamp 302 may press the cutting insert 100 toward the shim 200 and may also press the cutting insert 100 toward the holder 300. The cutting insert 100 is fixed in contact with the shim 200, the holder 300 and the clamp 302 to form the cutting tool assembly 1.

Figure 3:
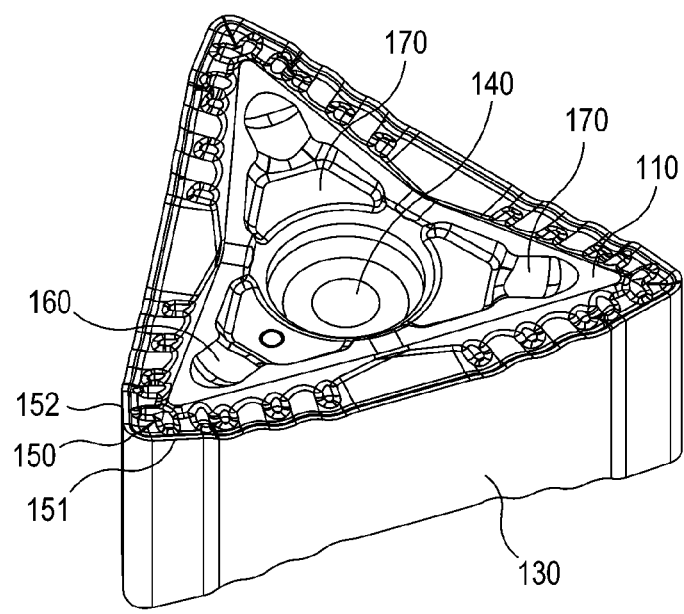
FIG. 3 is a perspective view showing a cutting insert according to one embodiment of the present disclosure.
Figure 4:
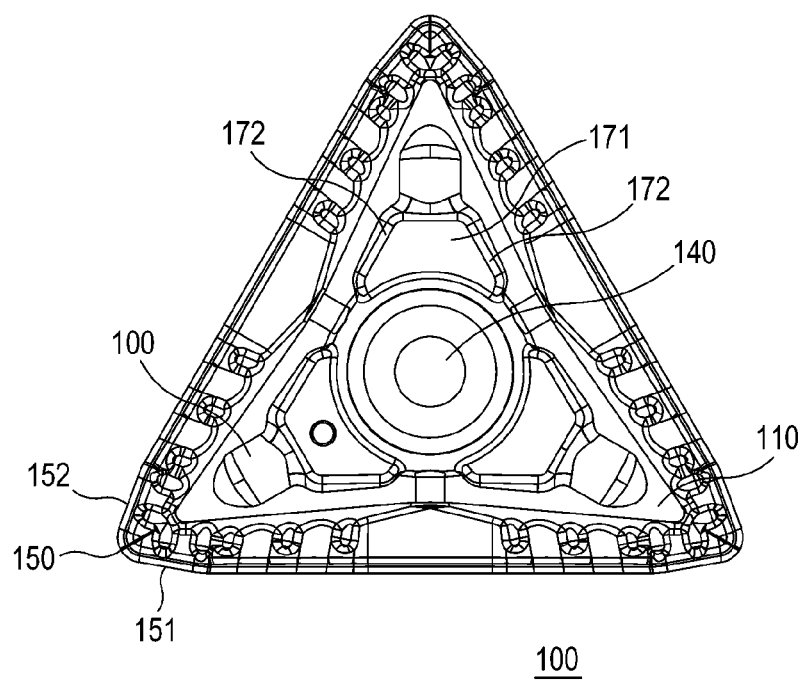
FIG. 4 is a plan view of the cutting insert shown in FIG. 3.
Figure 5:
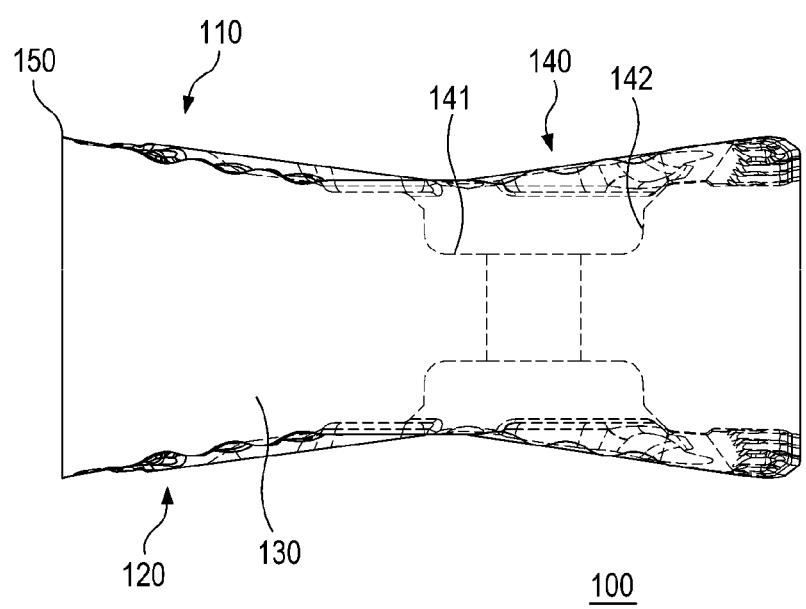
FIG. 5 is a side view of the cutting insert shown in FIG. 3.

FIG. 3 is a perspective view showing the cutting insert 100 according to one embodiment of the present disclosure. FIG. 4 is a plan view of the cutting insert 100 shown in FIG. 3. FIG. 5 is a side view of the cutting insert 100 shown in FIG. 3.

Referring to FIGS. 3 to 5, the cutting insert 100 includes an upper surface 110, a lower surface 120, three side surfaces 130 extending between the upper surface 110 and the lower surface 120, and an insert hole 140 extending through the upper surface 110 and the lower surface 120. The cutting insert 100 may have a triangular shape, for example, and may be symmetrical about the insert hole 140 extending through the upper surface 110 and the lower surface 120. The upper surface 110 and the lower surface 120 of the cutting insert 100 may be entirely or partially flat, and may include a curved surface formed in at least a portion of the upper surface 110 and the lower surface 120. In addition, one portion of the upper surface 110 and the lower surface 120 may be formed to be inclined with respect to another portion. Corner portions 150 are formed in the cutting insert 100, and cutting edges 151 and 152 are formed in each of the corner portions 150. The cutting edges 151 and 152 are used to cut a workpiece W. Rake faces may be formed such that the thickness of the cutting insert 100 decreases from the corner portions 150 of the cutting insert 100 toward the insert hole 140. Clamp contact surfaces 141 and 142 with which the clamp 302 makes contact when the cutting insert 100 is fixed to the holder 300, may be formed in the insert hole 140. On the clamp contact surface 141, the clamp 302 may exert a force that presses the cutting insert 100 toward the shim 200. On the clamp contact surface 142, the clamp 302 may exert a force that presses the cutting insert 100 toward the holder 300. The cutting insert 100 may be provided with a total of six corner portions 150 including three corner portions 150 on the upper surface 110 and three corner portions 150 on the lower surface 120. Cutting edges 151 and 152 may be formed at each of the corner portions 150. Recesses are formed on the upper surface 110 and the lower surface 120. The recesses includes a first recess 160 located on a side far from the insert hole 140 as a center and a second recess 170 located on a side near the insert hole 140. A bottom surface 171 and a side wall 172 may be formed in the second recess 170. On the upper surface 110 and the lower surface 120 of the cutting insert 100, the respective corner portions 150 and the recesses may be formed symmetrically with respect to the insert hole 140. The upper surface 110 and the lower surface 120 may also be formed symmetrically to each other. When the cutting insert 100 is supported by the shim 200, the first recess 160 and the second recess 170 may receive a first protrusion 260 and a second protrusion 270 of the shim 200 corresponding thereto. The side wall 172 of the second recess 170 does not make contact with the side wall 272 of the second protrusion 270 of the shim 200 corresponding thereto. The above embodiment has been described based on the case where the mounting portion 200 or 305 is the shim 200. However, when the mounting portion 200 or 305 is the bottom surface 305 of the holder pocket portion, the first protrusion 260 and the second protrusion 270 are formed on the bottom surface 305 of the holder pocket portion.

Figure 6:
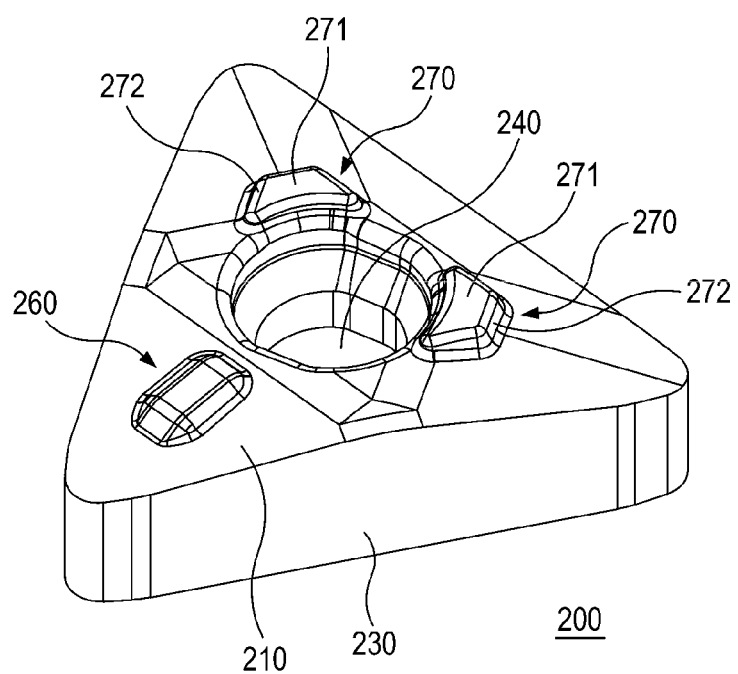
FIG. 6 is a perspective view showing a shim for supporting the cutting insert according to one embodiment of the present disclosure.

FIG. 6 is a perspective view showing the shim 200 for supporting the cutting insert 100 according to one embodiment of the present disclosure.

The shim 200 for supporting the cutting insert 100 according to one embodiment will be described with reference to FIG. 6.

The shim 200 may have, for example, a triangular shape or other shapes. The shim 200 includes an upper surface 210, a lower surface 220, three side surfaces 230 extending between the upper surface 210 and the lower surface 220, and a shim hole 240 extending through the upper surface 210, the lower surface 220, the three side surfaces 230 extending between the upper surface 210 and the lower surface 220. When the shim 200 is fixed to the holder 300, a fixing means such as a screw or the like passes through the shim hole 240. A first protrusion 260 and a second protrusion 270 corresponding to the first recess 160 and the second recess 170 of the cutting insert 100 are formed on the upper surface 210 of the shim 200, i.e., the surface of the shim 200 supporting the cutting insert 100. The protrusions include a first protrusion 260 located far from the shim hole 240 as a center and a second protrusion 270 located near the shim hole 240. The second protrusion 270 is formed to have an upper surface 271 and a side wall 272. When the cutting insert 100 is supported by the shim 200, the first protrusion 260 and the second protrusion 270 are inserted into the first recess 160 and the second recess 170 of the cutting insert 100 corresponding thereto to support the cutting insert 100. Only the upper surface 271 of the second protrusion 270 makes contact with the bottom surface 171 of the second recess 170. The side wall 272 of the second protrusion 270 does not make contact with the side wall 172 of the second recess 170. A groove for fixing the shim 200 when the shim 200 is mounted on the holder 300 may be formed on the lower surface 220 of the shim 200.

Figure 7:
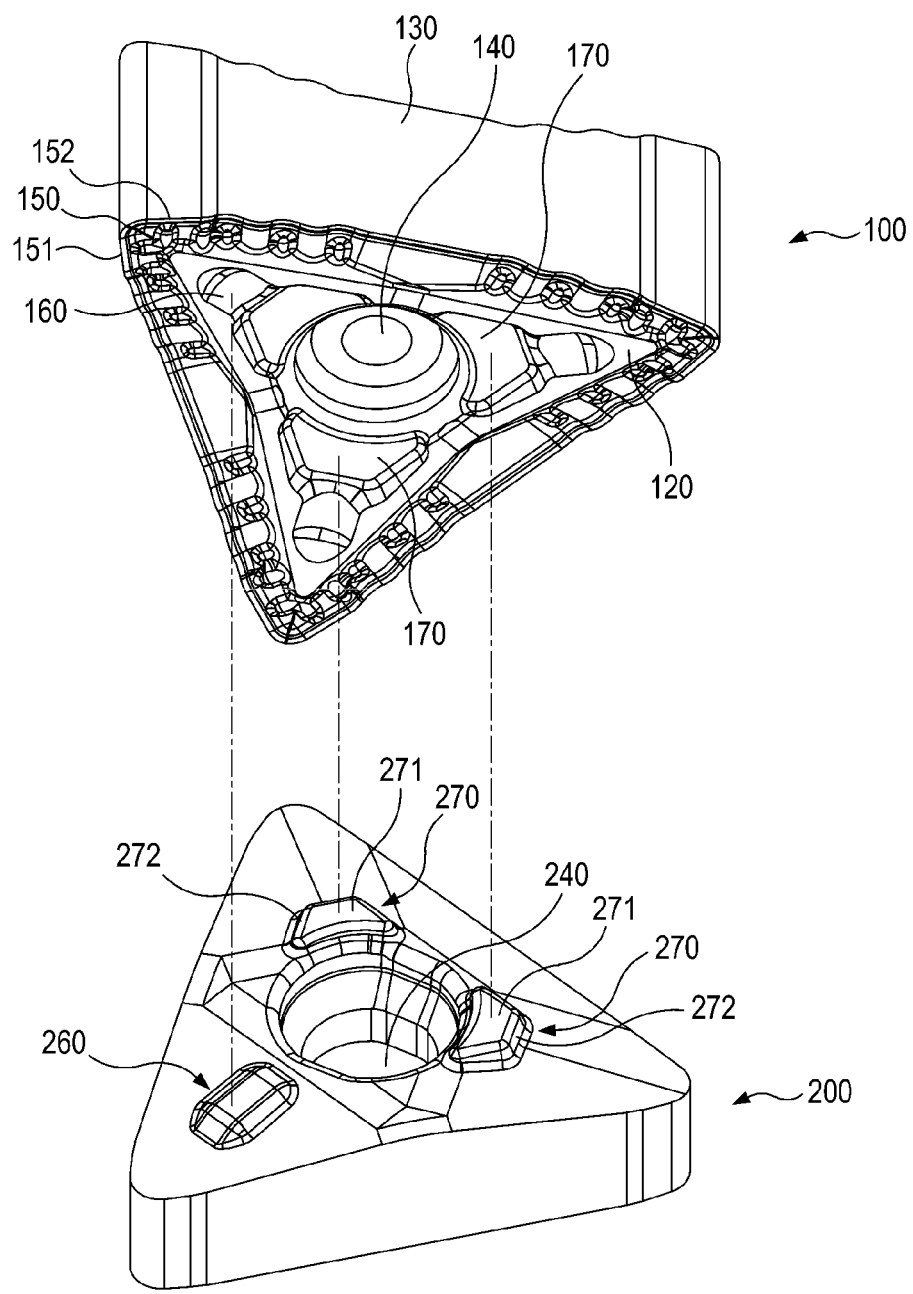
FIG. 7 is a perspective view schematically showing a contact portion between the cutting insert shown in FIG. 3 and the shim shown in FIG. 6.
Figure 8:
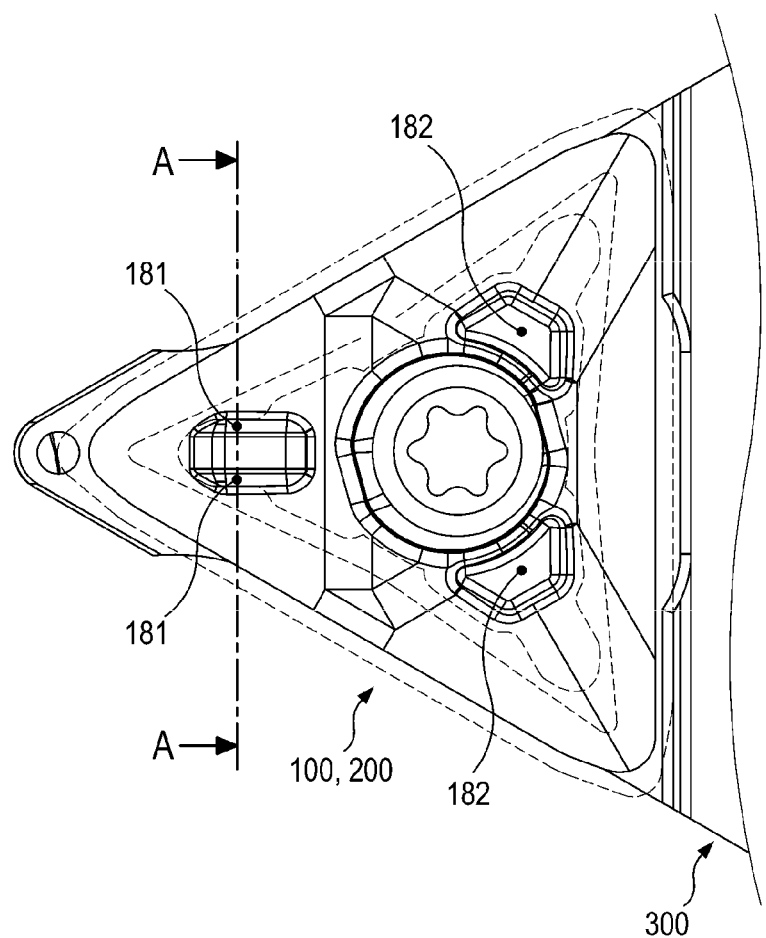
FIG. 8 is a view for explaining the contact portion between the cutting insert shown in FIG. 3 and the shim shown in FIG. 6.
Figure 9:
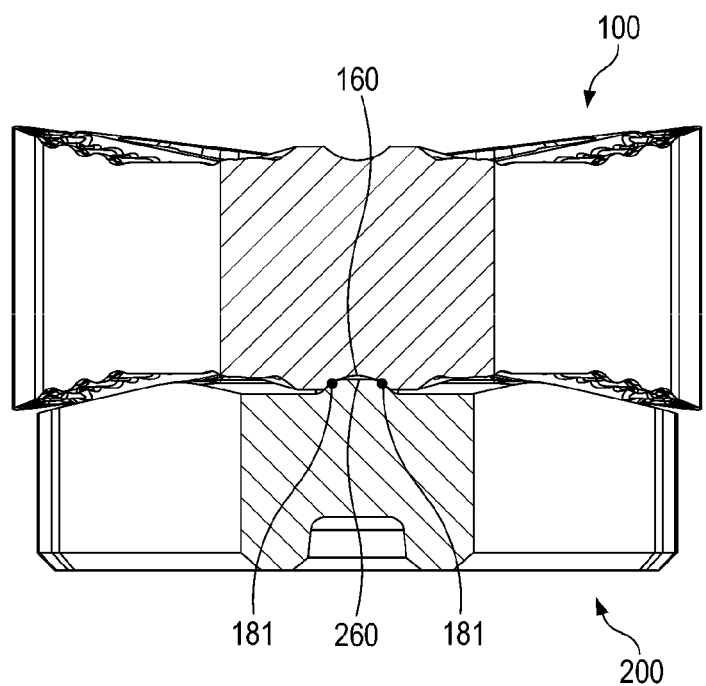
FIG. 9 is a sectional view taken along line A-A in FIG. 8.
Figure 10:
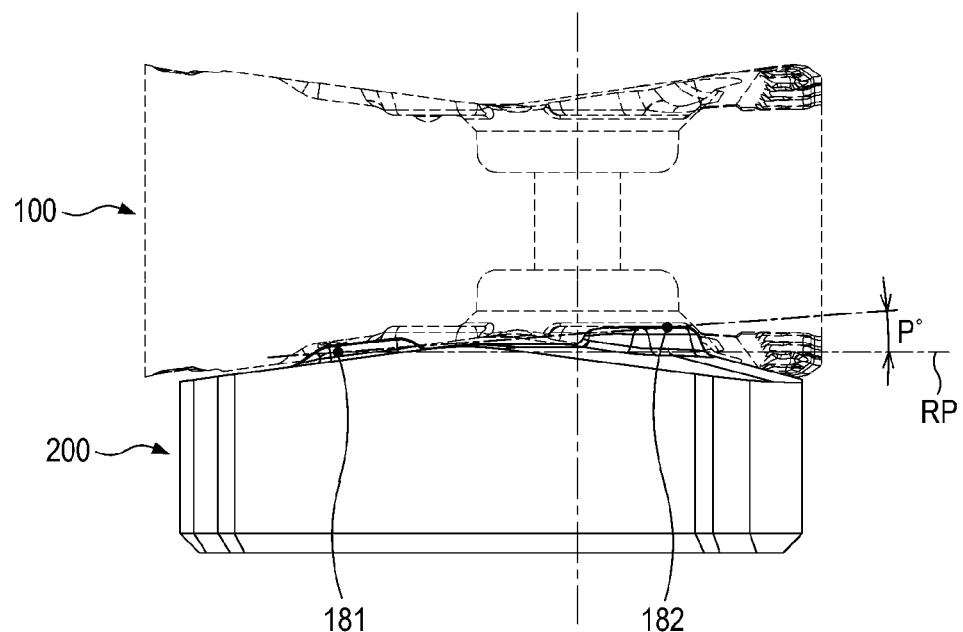
FIG. 10 is a side view of the cutting insert and the shim shown in FIG. 8.

FIG. 7 is a perspective view schematically showing a contact portion between the cutting insert 100 shown in FIG. 3 and the shim 200 shown in FIG. 6. FIG. 8 is a view for explaining the contact portion between the cutting insert 100 shown in FIG. 3 and the shim 200 shown in FIG. 6. FIG. 9 is a sectional view taken along line A-A in FIG. 8. FIG. 10 is a side view of the cutting insert 100 and the shim 200 shown in FIG. 8.

A contact point between the cutting insert 100 and the shim 200 according to one embodiment will be described with reference to FIGS. 7 to 10.

When the cutting insert 100 is supported by the shim 200, the first recess 160 of the cutting insert 100 makes contact with the first protrusion 260 of the shim 200 at a pair of first contact points 181. The bottom surfaces 171 of the two second recesses 170 of the cutting insert 100 make contact with the upper surfaces 271 of the two second protrusions 270 of the shim 200 at second contact points 182, respectively. Since the cutting insert 100 and the shim 200 make contact with each other at the pair of first contact points 181, the cutting insert 100 is firmly supported not only in the vertical direction but also in the lateral direction. Accordingly, it is possible to minimize the left/right movement and vibration of the cutting insert 100 when performing a cutting operation. The upper surface 271 of the second protrusion 270 of the shim 200 is formed in a rounded curved surface so as to make point-to-point contact rather than surface-to-surface contact with the bottom surface 171 of the second recess 170 of the cutting insert 100. When the cutting insert 100 is supported by the shim 200, the cutting insert 100 is merely placed on the shim 200 while making lateral contact with the shim 200 only at the first contact point 181 without making lateral contact with the shim 200 at the second contact point 182. Since the cutting insert 100 is merely placed on the shim 200 without making lateral contact with the shim 200 at the second contact point 182, the cutting insert 100 can be stably supported without interfering with the lateral support at the first contact point 181.

In addition, the cutting insert 100 is mostly formed by a primary pressing process and a secondary grinding process. The second recess 170 is finished by the primary pressing process, and is not subjected to the grinding process. In order for the cutting insert 100 to be stably supported by the shim 200, the relative height difference between the first recess 160 and the second recess 170 and the relative height difference between the first protrusion 260 and the second protrusion 270 of the shim 200 corresponding thereto are important. Since the grinding process is difficult to precisely control as compared to the pressing process, if the second recess 170 is finished only by the pressing process, it is possible to easily perform the control of the relative height difference described above, and the manufacturing and management of the cutting tool assembly.

When the cutting insert 100 is supported by the shim 200, the first contact point 181 is located at a position lower than the second contact point 182 with respect to the reference plane RP perpendicular to the extension direction of the insert hole 140. That is, a line connecting one of the first contact points 181 and the second contact point 182 located on the same side as the first contact point 181 with respect to the insert hole 140 has an inclination angle p with respect to the reference plane RP perpendicular to the extension direction of the insert hole 140. Due to the inclination angle p, the cutting insert 100 can be stably brought into contact with and mounted on the shim 200 at the first contact point 181 as compared with the case where there is no inclination angle (p=0°) or where the inclination angle is opposite (p<0°). The stable contact of the first contact point 181 is very important in that it functions to prevent the left/right movement or micro-vibration of the cutting insert 100 when performing a cutting operation. At the second contact point 182, the side wall 172 of the second recess 170 and the side wall 272 of the second protrusion 270 do not make contact with each other, and the cutting insert 100 is merely placed on the shim 200. As a result, the cutting insert 100 can be stably supported without interfering with the function of preventing micro-vibration of the first contact point 181.

In the cutting insert 100 and the shim 200 according to one embodiment, the inclination angle p may be greater than 0° and 9° or less, preferably 4° to 6°. If the inclination angle p is less than 4°, the active corner portion (the corner portion on the side of the first recess) of the cutting insert 100 may be slightly lifted up, and the initial positioning of the cutting insert 100 before the fixing by the fixing means 301 may become unstable. If the inclination angle p is greater than 6°, the active corner portion of the cutting insert 100 may finely slide down, and the initial positioning of the cutting insert 100 before the fixing by the fixing means 301 may become unstable.

Figure 11:
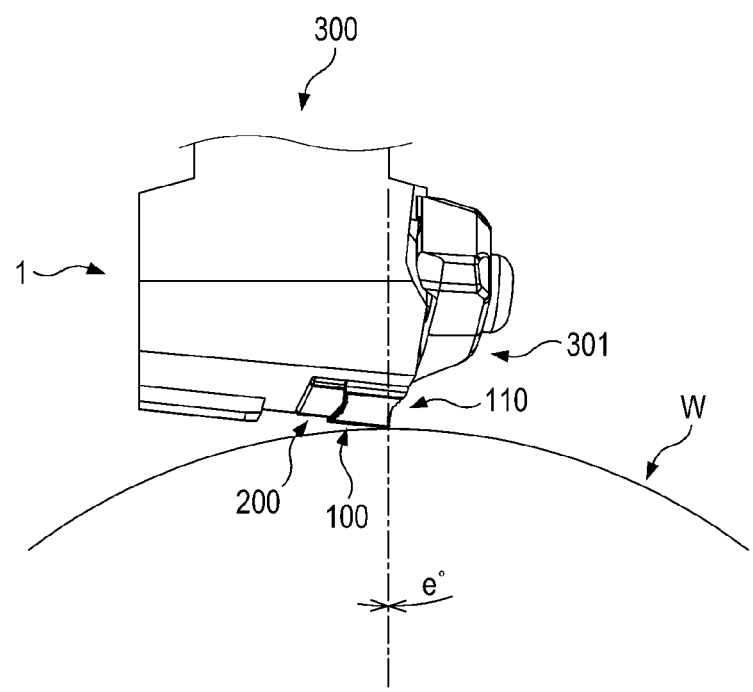
FIG. 11 is a view showing a state in which the cutting tool assembly shown in FIG. 1 cuts a workpiece.

FIG. 11 is a view showing a state in which the cutting tool assembly 1 shown in FIG. 1 cuts the workpiece W.

The cutting of the workpiece W by the cutting tool assembly 1 according to one embodiment will be described with reference to FIG. 11.

When the cutting insert 100 according to one embodiment is mounted on the holder 300, the angle e formed by the upper surface 110 of the cutting insert 100 with respect to the centerline of the workpiece W to be cut by the cutting insert 100 is −5° to +5°. Therefore, when performing a cutting operation, it is possible to secure a space for smooth chip discharging. This makes it possible to improve the state of chips and the flow of chips.

Figure 12:
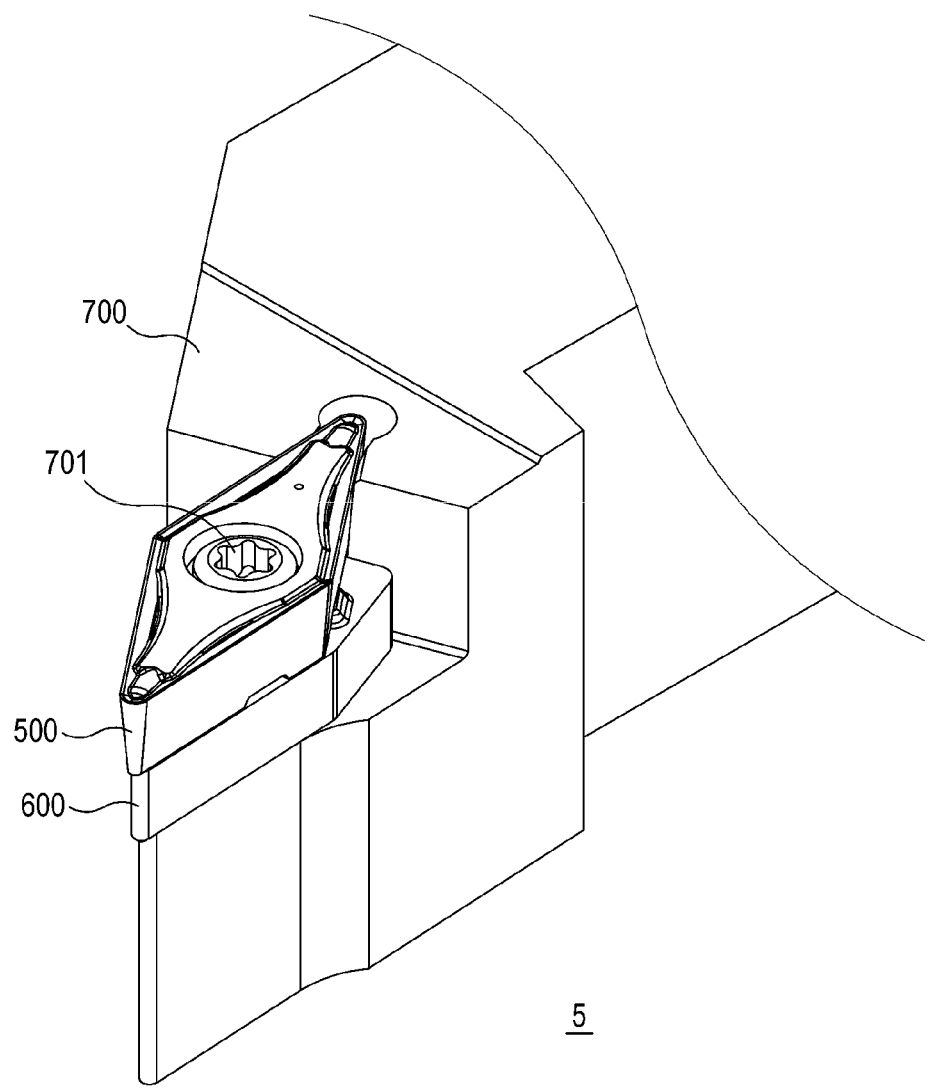
FIG. 12 is a perspective view showing a cutting tool assembly according to another embodiment of the present disclosure.
Figure 13:
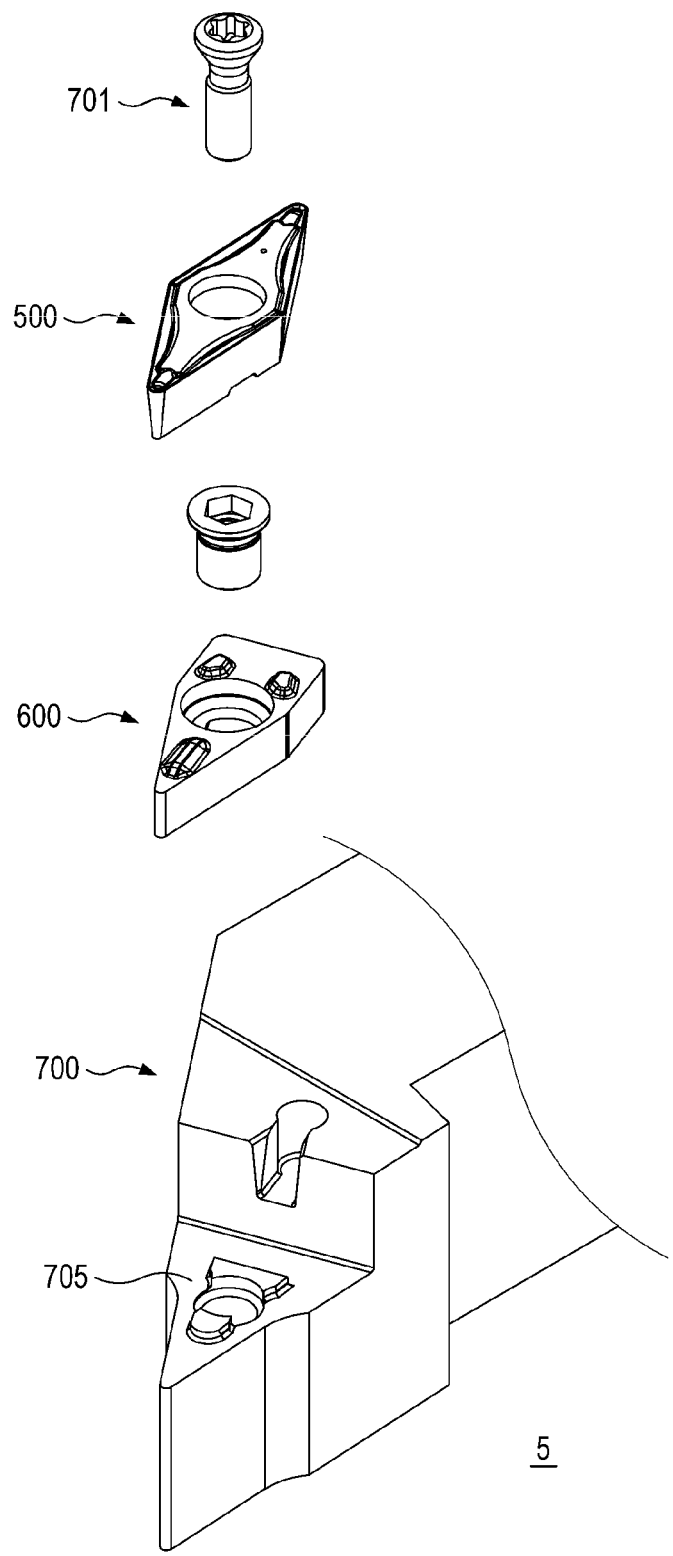
FIG. 13 is an exploded perspective view of the cutting tool assembly shown in FIG. 12.

FIG. 12 is a perspective view showing a cutting tool assembly 5 according to another embodiment of the present disclosure. FIG. 13 is an exploded perspective view of the cutting tool assembly 5 shown in FIG. 12.

A cutting tool assembly 5 according to another embodiment will be described with reference to FIGS. 12 and 13. The cutting tool assembly 5 may include a cutting insert 500, a mounting portion 600 or 705, and a holder 700. The mounting portion 600 may be a shim 600 or a bottom surface 705 of a holder pocket portion if there is no shim. Hereinafter, a case where the mounting portion 600 or 705 is a shim will be described.

When the mounting portion 600 or 705 is the shim 600, a groove formed on the lower surface 620 of the shim 600 is coupled with a protrusion formed on the bottom surface 705 of the holder pocket portion, and the shim 600 is fixed to the holder 700 by means of a fixing means such as a screw or the like. The cutting insert 500 is located on the upper surface 610 of the shim 600, and the screw or the like makes contact with the insert hole 540 of the cutting insert 500, so that the cutting insert 500 is fixed to the shim 600 and the holder 700. The cutting insert 500 is fixed in contact with the shim 600, the holder 700 and the fixing means 701 to form the cutting tool assembly 5.

Figure 14:
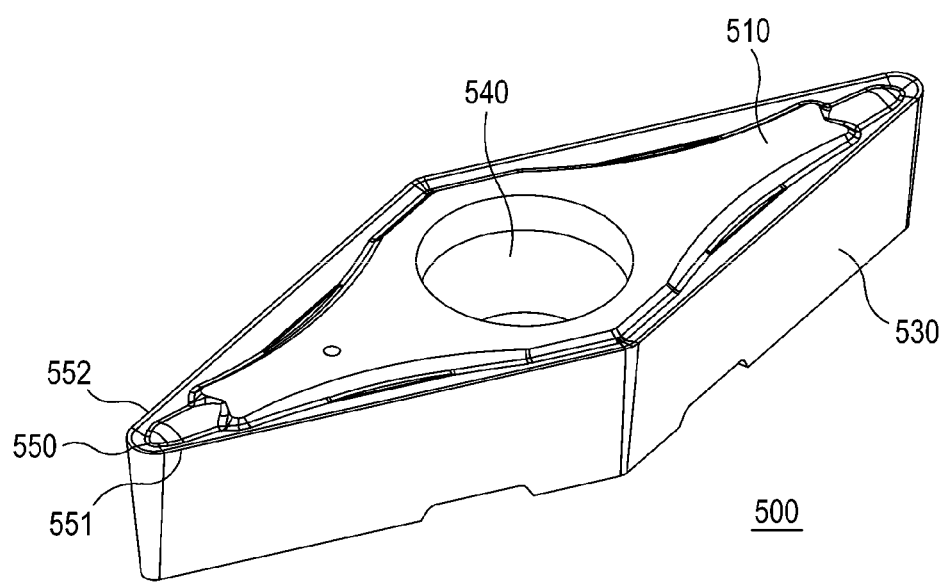
FIG. 14 is a perspective view showing a cutting insert according to another embodiment of the present disclosure.
Figure 15:
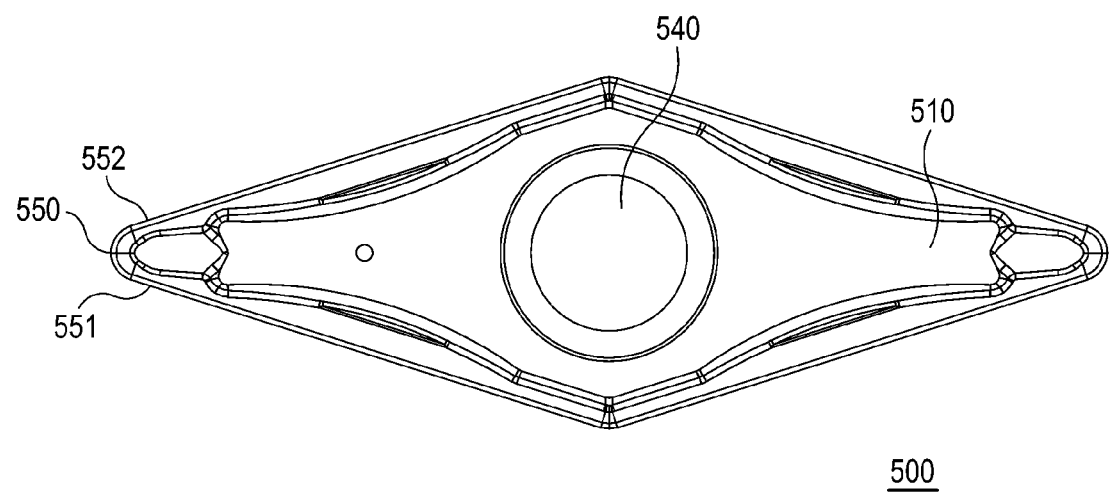
FIG. 15 is a plan view of the cutting insert shown in FIG. 14.
Figure 16:
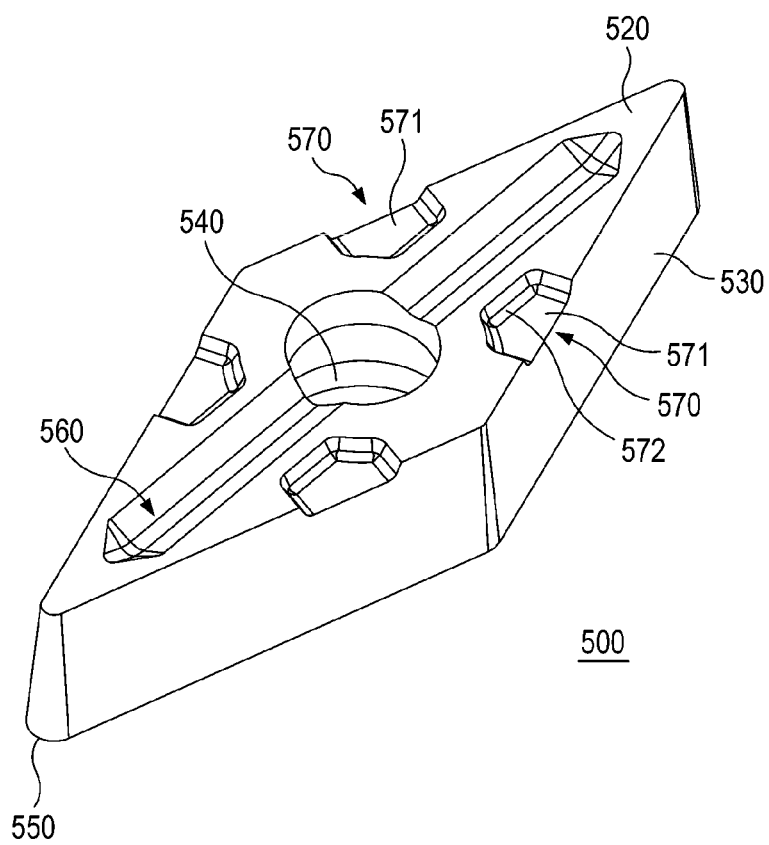
FIG. 16 is a perspective view of the cutting insert shown in FIG. 14, which is viewed from another direction.
Figure 17:
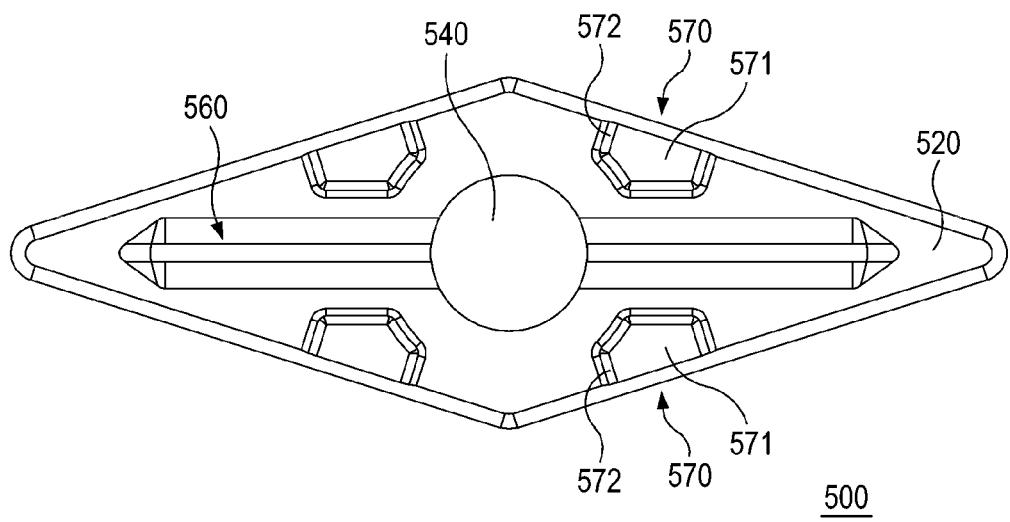
FIG. 17 is a bottom view of the cutting insert shown in FIG. 14.
Figure 18:
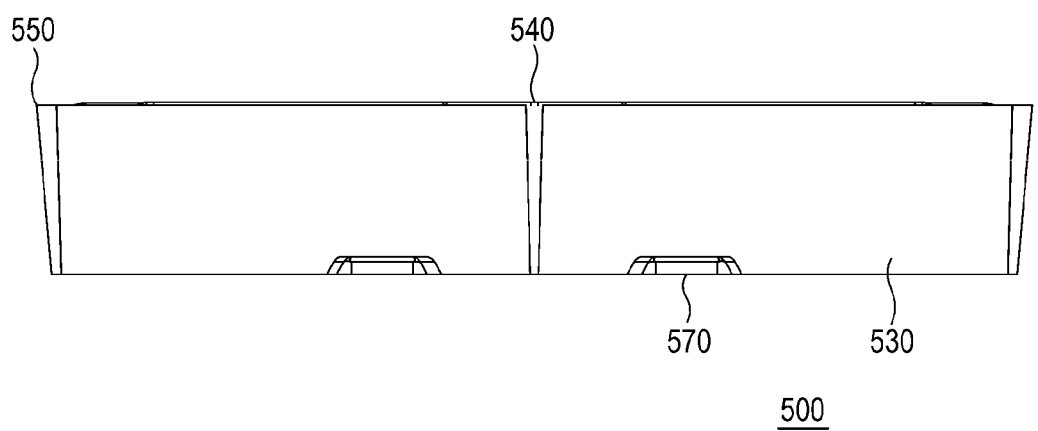
FIG. 18 is a side view of the cutting insert shown in FIG. 14.

FIG. 14 is a perspective view showing a cutting insert 500 according to another embodiment of the present disclosure. FIG. 15 is a plan view of the cutting insert 500 shown in FIG. 14. FIG. 16 is a perspective view of the cutting insert 500 shown in FIG. 14, which is viewed from another direction. FIG. 17 is a bottom view of the cutting insert 500 shown in FIG. 14. FIG. 18 is a side view of the cutting insert 500 shown in FIG. 14.

A cutting insert 500 according to another embodiment will be described with reference to FIGS. 14 to 18.

The cutting insert 500 includes an upper surface 510, a lower surface 520, four side surfaces 530 extending between the upper surface 510 and the lower surface 520, and an insert hole 540 extending through the upper surface 510 and the lower surface 520. The cutting insert 500 may be provided with two corner portions 550 on the upper surface 510 thereof. Cutting edges 551 and 552 may be formed at the respective corner portions 550. The two corner portions 550 are rotationally symmetrical by 180° with respect to the center axis of the insert hole 540. Recesses are formed on the lower surface 520. The recesses include a first recess 560 extending from the insert hole 540 toward the corner portion 550 and a second recess 570 formed around the first recess 560. A bottom surface 571 and a side wall 572 may be formed in the second recess 570. The lower surface 520 of the cutting insert 500 is also rotationally symmetrical by 180° with respect to the center axis of the insert hole 540. When the cutting insert 500 is supported by the shim 600, the first recess 560 and the second recess 570 receive a first protrusion 660 and a second protrusion of the shim 600 corresponding thereto, and the side wall 572 of the second recess 570 does not make contact with the side wall 672 of the corresponding second protrusion 670 of the shim 600. The above embodiment has been described based on the case where the mounting portion 600 or 705 is the shim 600. However, if the mounting portion 600 or 705 is the bottom surface 705 of the holder pocket portion, the first protrusion 660 and the second protrusion 670 are formed on the bottom surface 705 of the holder pocket portion.

Figure 19:
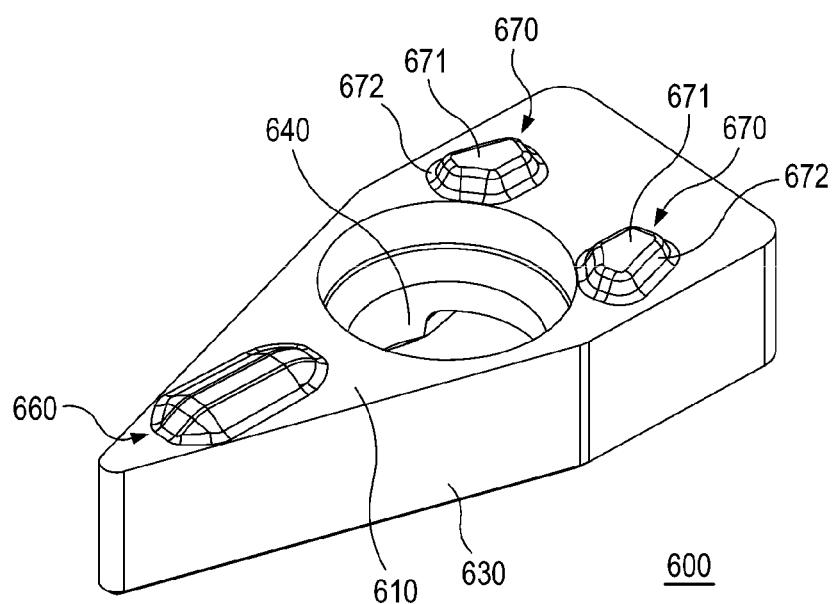
FIG. 19 is a perspective view showing a shim for supporting the cutting insert according to another embodiment of the present disclosure.

FIG. 19 is a perspective view showing the shim 600 for supporting the cutting insert 500 according to another embodiment of the present disclosure.

The shim 600 for supporting the cutting insert 500 according to another embodiment of the present disclosure will be described with reference to FIG. 19.

The shim 600 includes an upper surface 610, a lower surface 620, a side surface 630 extending between the upper surface 610 and the lower surface 620, and a shim hole 640 extending through the upper surface 610 and the lower surface 620. When the shim 600 is fixed to the holder 700, a fixing means such as a screw or the like passes through the shim hole 640. A first protrusion 660 and a second protrusion 670 corresponding to the first recess 560 and the second recess 570 of the cutting insert 500 are formed on the upper surface 610 of the shim 600, i.e., the surface of the shim 600 supporting the cutting insert 500. The protrusions include a first protrusion 660 located at a side far from the shim hole 640 as a center and a second protrusion 670 located near the shim hole 640. The second protrusion 670 is formed to have an upper surface 671 and a side wall 672. When the cutting insert 500 is supported by the shim 600, the first protrusion 660 and the second protrusion 670 are inserted into and supported by the first recess 560 and the second recess 570 of the cutting insert 500 corresponding thereto. Only the upper surface 671 of the second protrusion 670 makes contact with the bottom surface 571 of the second recess 570. The side wall 672 of the second protrusion 670 does not make contact with the side wall 572 of the second recess 570.

Figure 20:
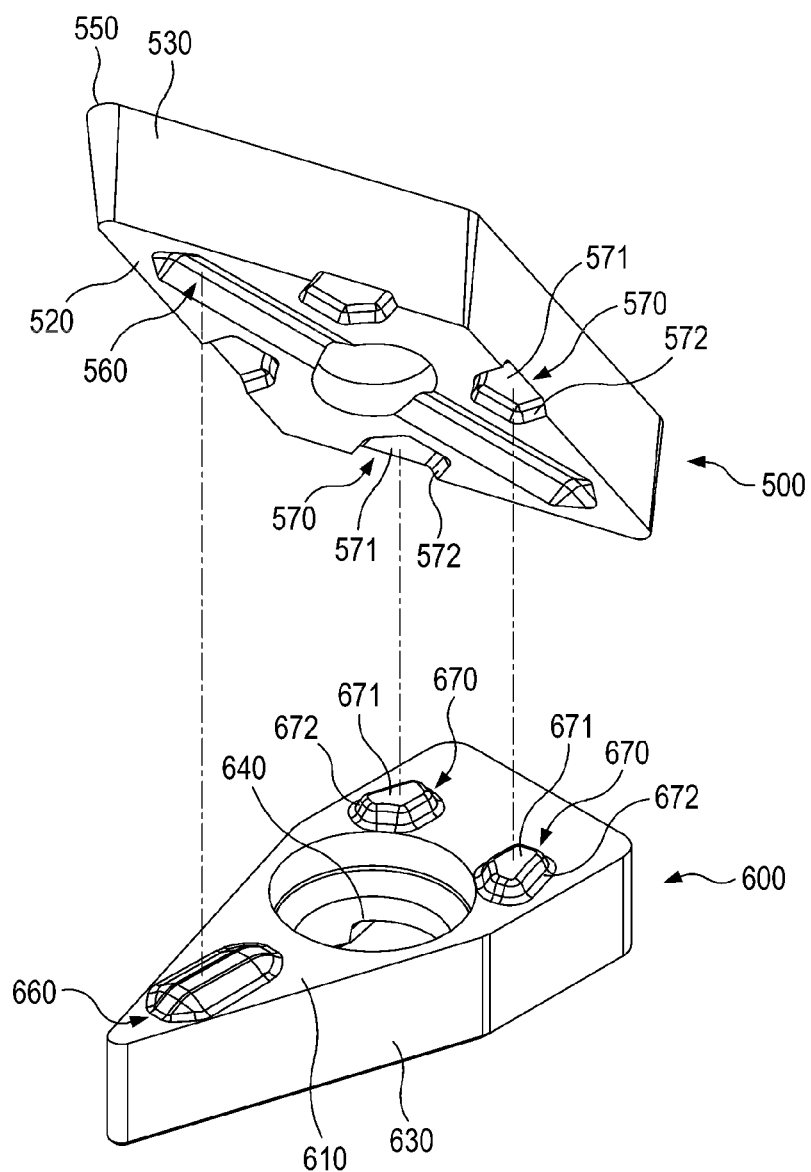
FIG. 20 is a perspective view schematically showing a contact portion between the cutting insert shown in FIG. 14 and the shim shown in FIG. 19.
Figure 21:
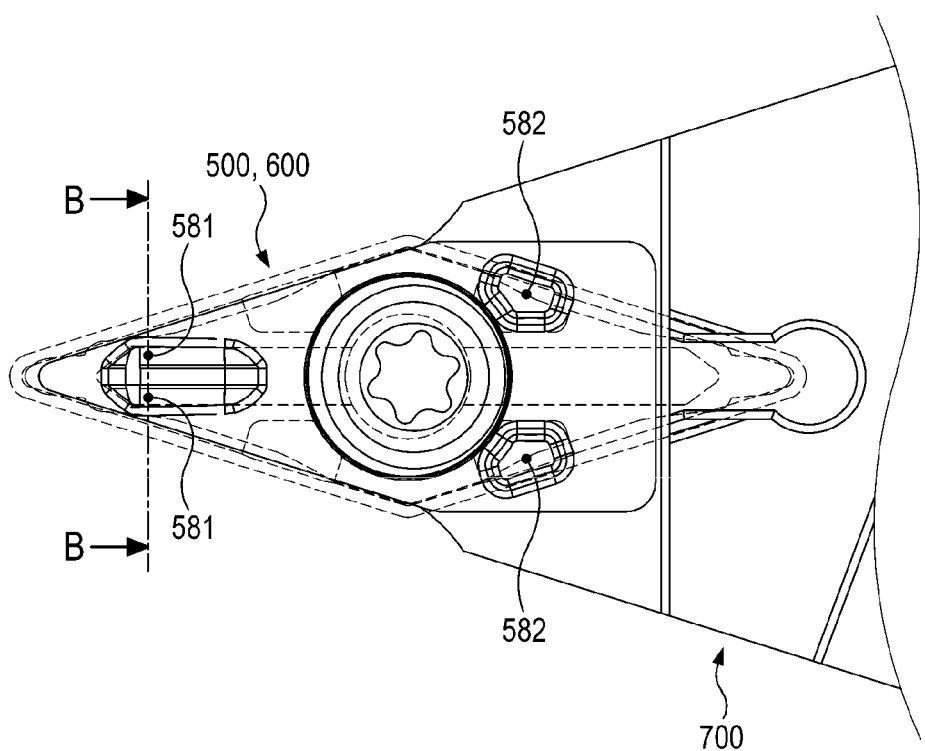
FIG. 21 is a view for explaining the contact portion between the cutting insert shown in FIG. 14 and the shim shown in FIG. 19.
Figure 22:
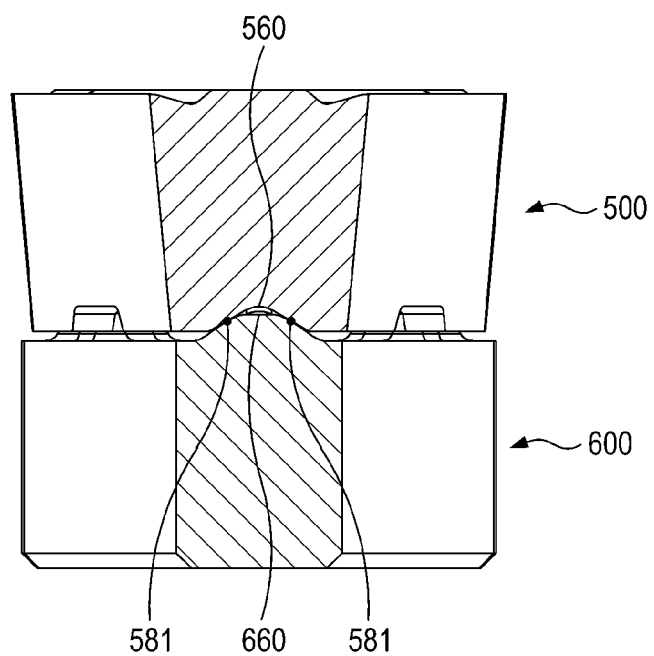
FIG. 22 is a sectional view taken along line B-B in FIG. 21.
Figure 23:
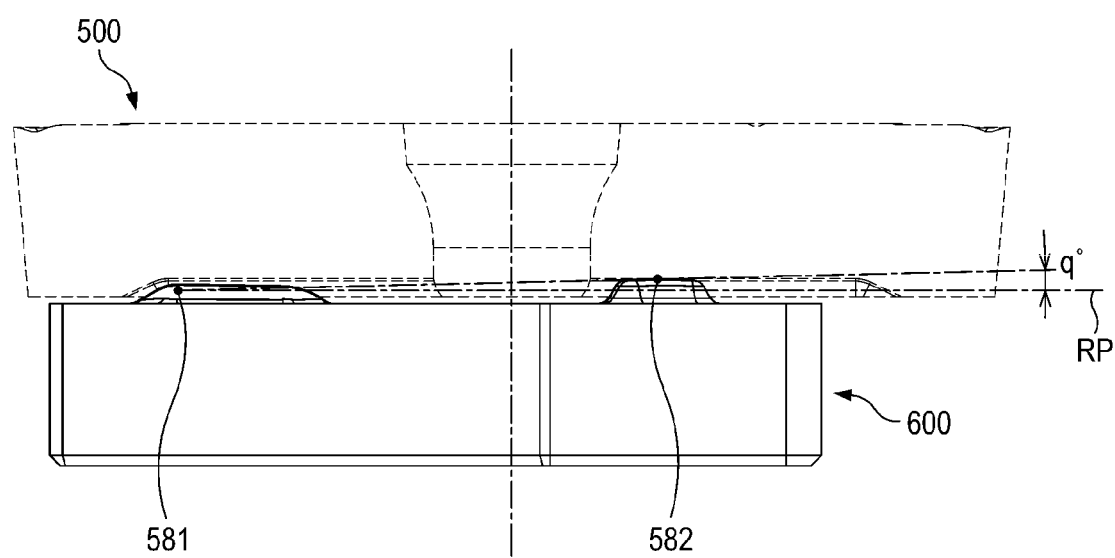
FIG. 23 is a side view of the cutting insert and the shim shown in FIG. 21.

FIG. 20 is a perspective view schematically showing a contact portion between the cutting insert 500 shown in FIG. 14 and the shim 600 shown in FIG. 19. FIG. 21 is a view for explaining the contact portion between the cutting insert 500 shown in FIG. 14 and the shim 600 shown in FIG. 19. FIG. 22 is a sectional view taken along line B-B in FIG. 21. FIG. 23 is a side view of the cutting insert 500 and the shim 600 shown in FIG. 21.

A contact point between the cutting insert 500 and the shim 600 according to another embodiment will be described with reference to FIGS. 20 to 23.

When the cutting insert 500 is supported by the shim 600, the first recess 560 of the cutting insert 500 makes contact with the first protrusion 660 of the shim 600 at two first contact points 581. The bottom surfaces 571 of the two second recesses 570 of the cutting insert 500 make contact with the upper surfaces 671 of the two second protrusions 670 of the shim 600 at second contact points 582, respectively. Since the cutting insert 500 and the shim 600 make contact with each other at the two first contact points 581, the cutting insert 500 is firmly supported not only in the vertical direction but also in the lateral direction. Accordingly, it is possible to minimize the left/right movement and vibration of the cutting insert 500 when performing a cutting operation. The upper surface 671 of the second protrusion 670 of the shim 600 is formed in a rounded curved surface so as to make point-to-point contact rather than surface-to-surface contact with the bottom surface 571 of the second recess 570 of the cutting insert 500. When the cutting insert 500 is supported by the shim 600, the cutting insert 500 is merely placed on the shim 600 while making lateral contact with the shim 600 only at the first contact point 581 without making lateral contact with the shim 600 at the second contact point 582. Since the cutting insert 500 is merely placed on the shim 600 without making lateral contact with the shim 600 at the second contact point 582, the cutting insert 500 can be stably supported without interfering with the lateral support at the first contact point 581.

In addition, the cutting insert 500 is mostly formed by a primary pressing process and a secondary grinding process.

The second recess 570 is finished by the primary pressing process, and is not subjected to the grinding process. In order for the cutting insert 500 to be stably supported by the shim 600, the relative height difference between the first recess 560 and the second recess 570 and the relative height difference between the first protrusion 660 and the second protrusion 670 of the shim 600 corresponding thereto are important. Since the grinding process is difficult to precisely control as compared to the pressing process, if the second recess 570 is finished only by the pressing process, it is possible to easily perform the control of the relative height difference described above, and the manufacturing and management of the cutting tool assembly.

When the cutting insert 500 is supported by the shim 600, the first contact point 581 is located at a position lower than the second contact point 582 with respect to the reference plane RP perpendicular to the extension direction of the insert hole 540. In other words, a line connecting one of the first contact points 581 and the second contact point 582 located on the same side as the first contact point 581 with respect to the insert hole 540 has an inclination angle q with respect to the reference plane RP perpendicular to the extension direction of the insert hole 540. Due to the inclination angle q, the cutting insert 500 can be stably brought into contact with and mounted on the shim 600 at the first contact point 581 as compared with the case where there is no inclination angle (q=0°) or where the inclination angle is opposite (q<0°). The stable contact of the first contact point 581 is very important in that it functions to prevent the left/right movement or micro-vibration of the cutting insert 500 when performing a cutting operation. At the second contact point 582, the side wall 572 of the second recess 570 and the side wall 672 of the second protrusion 670 do not make contact with each other, and the cutting insert 500 is merely placed on the shim 600. As a result, the cutting insert 500 can be stably supported without interfering with the function of preventing micro-vibration of the first contact point 581.

In the cutting insert 500 and the shim 600 according to one embodiment, the inclination angle q may be greater than 0° and 9° or less, preferably 1° to 2°. If the inclination angle q is less than 1°, the active corner portion (the corner portion on the side of the first recess) of the cutting insert 500 may be slightly lifted up, and the initial positioning of the cutting insert 500 before the fixing by the fixing means 701 may become unstable. If the inclination angle q is greater than 2°, the active corner portion of the cutting insert 500 may finely slide down, and the initial positioning of the cutting insert 500 before the fixing by the fixing means 701 may become unstable.

Figure 24:
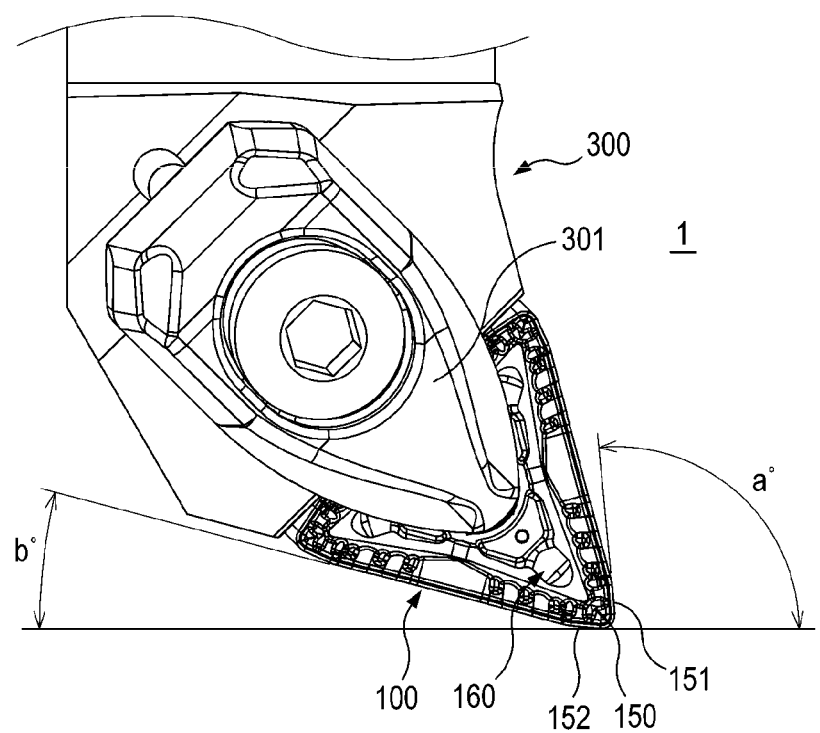
FIG. 24 is a view for explaining the shape of the holder of the cutting tool assembly shown in FIG. 1 and the angles formed by the cutting edges with respect to the rotation center axis of the workpiece.
Figure 25:
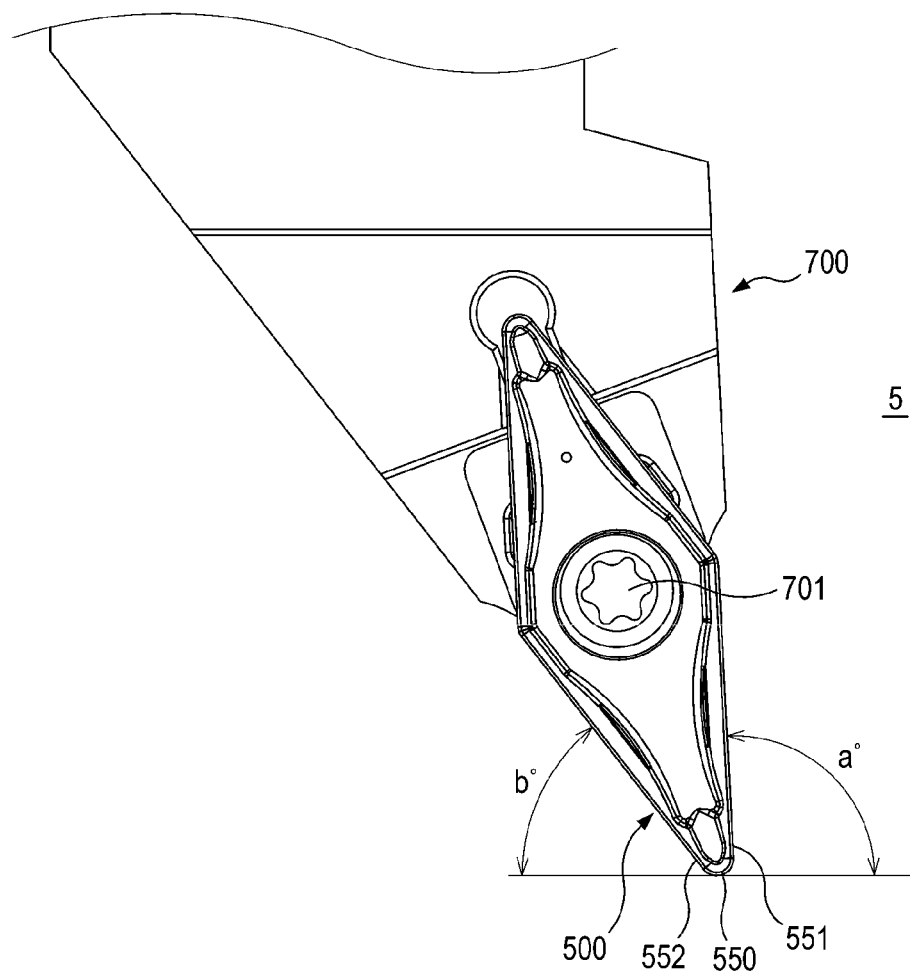
FIG. 25 is a view for explaining the shape of the holder of the cutting tool assembly shown in FIG. 12 and the angles formed by the cutting edges with respect to the rotation center axis of the workpiece.

FIG. 24 is a view for explaining the shape of the holder 300 of the cutting tool assembly 1 shown in FIG. 1 and the angles a and b formed by the cutting edges 151 and 152 with respect to the rotation center axis of the workpiece W. FIG. 25 is a view for explaining the shape of the holder 700 of the cutting tool assembly 5 shown in FIG. 12 and the angles a and b formed by the cutting edges 551 and 552 with respect to the rotation center axis of the workpiece W.

The features of the holders 300 and 700 of the cutting tool assemblies 1 and 5 shown in FIGS. 1 and 12 and the angles a and b formed by the cutting edges 151, 152, 551 and 552 with respect to the rotation center axis of the workpiece W will be described with reference to FIGS. 24 and 25.

In the cutting tool assemblies 1 and 5 shown in FIGS. 1 and 12, the first recesses 160 and 560 support the cutting inserts in the lateral direction. Therefore, it is possible to remove the insert support portions of the holders 300 and 700 existing in the back-turning direction. This makes it possible to use the cutting tool assemblies 1 and 5 at an appropriate depth of cut, and secure a space for smooth chip discharging. By minimizing the left/right movement and vibration of the cutting inserts, it is possible to prevent insert damage and improve precision. In addition, the angle b formed by the cutting edge 152 or 552 existing in the back-turning direction of the first recess 160 or 560 of the cutting insert 100 or 500 with respect to the rotation center axis of the workpiece W, i.e., the entering angle b at the time of back-turning is less than 90°, and the angle a formed by the cutting edge 151 or 551 existing in the front-turning direction of the first recess 160 or 560 of the cutting insert 100 or 500 with respect to the rotation center axis of the workpiece W, i.e., the entering angle a at the time of front-turning is more than 90°. Since the entering angle b at the time of back-turning is smaller than the entering angle a at the time of front-turning, it is even more important to secure a chip discharging space through the effective arrangement of the cutting edges 151, 152, 551 and 552 and the height of the chip former. The cutting inserts 100 and 500 according to one embodiment and another embodiment of the present disclosure can induce smooth chip generation and good chip discharging through the effective arrangement of the cutting edges 151, 152, 551 and 552 and the height of the chip former. Thus, it is possible to induce smooth chip discharging by processing the workpiece in the back-turning direction in which the entering angle is small.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cutting insert supported by a mounting portion when mounted on a cutting tool, comprising:
    an upper surface;
    a lower surface;
    a plurality of side surfaces extending between the upper surface and the lower surface;
    an insert hole extending through the upper surface and the lower surface; and
    a corner portion provided with a cutting edge,
    wherein:
    at least one of the upper surface and the lower surface has a plurality of recesses extending between the insert hole and the corner portion,
    the plurality of recesses includes a first recess into which a first portion of the mounting portion is inserted when the cutting insert is supported by the mounting portion, and a second recess into which a second portion of the mounting portion is inserted when the cutting insert is supported by the mounting portion,
    the second recess has a side wall spaced apart from the second portion of the mounting portion; and
    the first recess makes contact with the mounting portion at two points, and the second recess has a bottom surface making contact with the mounting portion.

2. The cutting insert of claim 1, wherein the first recess and the mounting portion make contact with each other at a pair of first contact points, the bottom surface of the second recess and the mounting portion make contact with each other at a second contact point, and a line connecting one of the first contact points and the second contact point forms an inclination angle with respect to a reference plane perpendicular to an extension direction of the insert hole.

3. The cutting insert of claim 2, wherein each of the upper surface and the lower surface includes a rake face inclined with respect to the reference plane perpendicular to the extension direction of the insert hole, the upper surface and the lower surface are symmetrical to each other, and each of the upper surface and the lower surface includes three corner portions.

4. The cutting insert of claim 3, wherein the inclination angle is more than 0° and 9° or less.

5. The cutting insert of claim 3, wherein the inclination angle is 4° to 6°.

6. The cutting insert of claim 2, wherein two corner portions are provided on the upper surface, and the two corner portions are rotationally symmetrical by 180° with respect to a center axis of the insert hole.

7. The cutting insert of claim 6, wherein the inclination angle is more than 0° and 9° or less.

8. The cutting insert of claim 6, wherein the inclination angle is 1° to 2°.

9. A cutting tool assembly, comprising:
a holder configured so that a cutting insert is supported by a mounting portion,
wherein the mounting portion includes a first protrusion and a second protrusion formed on a surface supporting the cutting insert,
the holder is configured to make contact with a side surface of the cutting insert to support the cutting insert and fix the cutting insert to the mounting portion through a fixing means,
the cutting insert includes an upper surface, a lower surface, a plurality of side surfaces extending between the upper surface and the lower surface, an insert hole extending through the upper surface and the lower surface, and a corner portion provided with a cutting edge,
at least one of the upper surface and the lower surface has a plurality of recesses extending between the insert hole and the corner portion,
the plurality of recesses includes a first recess into which the first protrusion of the mounting portion is inserted when the cutting insert is supported by the mounting portion and a second recess into which the second protrusion of the mounting portion is inserted when the cutting insert is supported by the mounting portion,
the second recess has a side wall spaced apart from the second protrusion of the mounting portion
the mounting portion is a shim, and the holder is configured to fix the cutting insert and the shim; and
the first recess makes contact with the first protrusion of the shim at two points, and the second recess has a bottom surface making contact with the second protrusion of the shim.

10. The cutting tool assembly of claim 9, wherein the first recess and the first protrusion of the shim make contact with each other at a pair of first contact points,
the bottom surface of the second recess and the second protrusion of the shim make contact with each other at a second contact point, and a line connecting one of the first contact points and the second contact point forms an inclination angle with respect to a reference plane perpendicular to an extension direction of the insert hole.

11. The cutting tool assembly of claim 10, wherein each of the upper surface and the lower surface of the cutting insert includes a rake face inclined with respect to the reference plane perpendicular to the extension direction of the insert hole, the upper surface and the lower surface are symmetrical to each other, and each of the upper surface and the lower surface includes three corner portions.

12. The cutting tool assembly of claim 11, wherein when the cutting insert is mounted on the holder, the upper surface of the cutting insert forms an angle of −5° to +5° with respect to a centerline of a workpiece to be cut by the cutting insert.

13. The cutting tool assembly of claim 10, wherein two corner portions are provided on the upper surface, and the two corner portions are rotationally symmetrical by 180° with respect to a center axis of the insert hole.

14. The cutting tool assembly of claim 10, wherein when the cutting insert is mounted on the holder, only the side surface of the cutting insert located on the opposite side of the first recess makes contact with the holder.

15. The cutting tool assembly of claim 10, wherein the cutting edge located on one side of the first recess of the cutting insert forms an angle of less than 90° with respect to a rotation center axis of a workpiece, and the cutting edge located on the other side of the first recess of the cutting insert forms an angle of greater than 90° with respect to the rotation center axis of a workpiece.

16. A cutting insert in combination with a shim upon which the cutting insert is seated, the cutting insert comprising:
upper and lower surfaces, and a plurality of side surfaces extending between the upper and lower surfaces;
an insert hole extending through the upper surface and the lower surface, the insert hole having a center axis around which at least the upper surface has rotational symmetry;
at least two corner portions, each formed at the juncture of two adjacent side surfaces, each corner portion provided with a pair of cutting edges formed at the intersection of the upper surface with said two adjacent side surfaces,
a first recess formed in the lower surface, adjacent each corner portion, and
at least two second recesses formed in the lower surface, away from the first recess, each second recess having a second recess side wall; wherein
in a plan view of the lower surface, the first recess has a different shape than the two second recesses; and
the shim comprising:
upper and lower shim surfaces, and a plurality of shim side surfaces extending between the upper and lower shim surfaces;
a shim hole extending through the upper and lower shim surfaces, the shim hole having a center axis around the upper surface lacks rotational symmetry;
at least one shim corner portion formed at the juncture of two adjacent shim side surfaces;
a first protrusion formed on the shim upper surface adjacent the at least one shim corner portion; and at least two second protrusions formed on the shim upper surface, away from the at least one shim corner portion, each second protrusion having a second protrusion side wall, wherein:

in a plan view of the upper shim surface, the first protrusion has a different shape than the second protrusions; and wherein:

the first protrusion at least partially occupies the first recess, the two second protrusions at least partially occupy the two second recesses, the cutting insert has a triangular shape with three side surfaces, three corner portions having cutting edges, three first recesses and three second recesses, each second recess being located between one of the first recesses and the insert hole;

the upper shim surface has exactly one first protrusion and exactly two second protrusions;

the first recess makes contact with the first protrusion at a pair of spaced apart first contact points;

the two second recesses make contact with upper surfaces of the two second protrusions at respective second contact points; and a line connecting one of the first contact points and the second contact point located on the same side as the first contact point with respect to the insert hole has a non-zero inclination angle (p) with respect to a reference plane (RP) perpendicular to an extension direction of the insert hole.

17. A cutting insert in combination with a shim upon which the cutting insert is seated, the cutting insert comprising:

upper and lower surfaces, and a plurality of side surfaces extending between the upper and lower surfaces;

an insert hole extending through the upper surface and the lower surface, the insert hole having a center axis around which at least the upper surface has rotational symmetry;

at least two corner portions, each formed at the juncture of two adjacent side surfaces, each corner portion provided with a pair of cutting edges formed at the intersection of the upper surface with said two adjacent side surfaces, a first recess formed in the lower surface, adjacent each corner portion, and at least two second recesses formed in the lower surface, away from the first recess, each second recess having a second recess side wall; wherein in a plan view of the lower surface, the first recess has a different shape than the two second recesses; and the shim comprising:

upper and lower shim surfaces, and a plurality of shim side surfaces extending between the upper and lower shim surfaces;

a shim hole extending through the upper and lower shim surfaces, the shim hole having a center axis around the upper surface lacks rotational symmetry;

at least one shim corner portion formed at the juncture of two adjacent shim side surfaces;

a first protrusion formed on the shim upper surface adjacent the at least one shim corner portion; and at least two second protrusions formed on the shim upper surface, away from the at least one shim corner portion, each second protrusion having a second protrusion side wall, wherein:

in a plan view of the upper shim surface, the first protrusion has a different shape than the second protrusions; and wherein:

the first protrusion at least partially occupies the first recess, the two second protrusions at least partially occupy the two second recesses, the cutting insert has a diamond shape, with four side surfaces, two corner portions having cutting edges, two first recesses located along an imaginary line extending between the two corner portions and separated from one another by the insert hole, and four second recesses, each of the four second recesses being located at an intersection between the lower surface and a different one of the four side surfaces;

the upper shim surface has exactly one first protrusion and exactly two second protrusions;

one of the first recesses makes contact with the first protrusion at a pair of spaced apart first contact points;

two of the four second recesses make contact with upper surfaces of the two second protrusions at respective second contact points; and a line connecting one of the first contact points and the second contact point located on the same side as the first contact point with respect to the insert hole has a non-zero inclination angle (p) with respect to a reference plane (RP) perpendicular to an extension direction of the insert hole.

* * * * *